(12) United States Patent
Liu et al.

(10) Patent No.: US 8,542,465 B2
(45) Date of Patent: Sep. 24, 2013

(54) SUSPENSION ASSEMBLY HAVING A MICROACTUATOR ELECTRICALLY CONNECTED TO A GOLD COATING ON A STAINLESS STEEL SURFACE

(75) Inventors: Yanning Liu, San Ramon, CA (US); Wing C. Shum, San Mateo, CA (US); John E. Scura, Paso Robles, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 232 days.

(21) Appl. No.: 12/725,730

(22) Filed: Mar. 17, 2010

(65) Prior Publication Data

US 2011/0228425 A1 Sep. 22, 2011

(51) Int. Cl.
*G11B 5/596* (2006.01)
*G11B 5/48* (2006.01)

(52) U.S. Cl.
USPC .................................... 360/294.4; 360/245.9

(58) Field of Classification Search
USPC ........................................... 360/294.4, 245.9
See application file for complete search history.

(56) References Cited

U.S. PATENT DOCUMENTS

| | | | |
|---|---|---|---|
| 5,521,778 A | 5/1996 | Boutaghou et al. | |
| 5,754,368 A * | 5/1998 | Shiraishi et al. ........... | 360/245.9 |
| 6,278,587 B1 | 8/2001 | Mei | |
| 6,307,715 B1 * | 10/2001 | Berding et al. ............ | 360/244.8 |
| 6,490,228 B2 | 12/2002 | Killam | |
| 6,856,075 B1 | 2/2005 | Houk et al. | |
| 7,064,928 B2 * | 6/2006 | Fu et al. ..................... | 360/245.9 |
| 7,177,119 B1 | 2/2007 | Bennin et al. | |
| 7,218,481 B1 * | 5/2007 | Bennin et al. .............. | 360/294.4 |
| 7,322,241 B2 | 1/2008 | Kai | |
| 7,382,582 B1 * | 6/2008 | Cuevas ...................... | 360/245.9 |
| 7,417,830 B1 | 8/2008 | Kulangara | |
| 7,459,835 B1 | 12/2008 | Mei et al. | |
| 7,509,859 B2 | 3/2009 | Kai | |
| 7,832,082 B1 * | 11/2010 | Hentges et al. ............ | 360/294.4 |
| 7,929,252 B1 * | 4/2011 | Hentges et al. ............ | 360/245.9 |
| 8,149,542 B2 | 4/2012 | Ando | |
| 2002/0075606 A1 * | 6/2002 | Nishida et al. ............. | 360/294.4 |
| 2002/0118492 A1 * | 8/2002 | Watanabe et al. .......... | 360/294.4 |
| 2009/0190263 A1 * | 7/2009 | Miura et al. ................ | 360/245.8 |
| 2009/0294740 A1 | 12/2009 | Kurtz et al. | |
| 2010/0177445 A1 | 7/2010 | Fuchino | |
| 2010/0271735 A1 | 10/2010 | Schreiber | |

OTHER PUBLICATIONS

U.S. Appl. No. 61/396,239, filed May 24, 2010, (16 pages).
U.S. Appl. No. 13/114,212, filed May 24, 2011, (23 pages).

* cited by examiner

*Primary Examiner* — Craig A. Renner

(57) ABSTRACT

A novel suspension assembly includes a suspension assembly mounting plate, a microactuator mounting structure extending from the suspension assembly mounting plate, a load beam extending from the microactuator mounting structure, and a laminated flexure attached to the load beam. The laminated flexure includes a tongue that has a read head bonding surface. The suspension assembly includes a stainless steel surface having a gold coating, and a piezoelectric microactuator attached to the microactuator mounting structure and electrically connected to the gold coating.

18 Claims, 4 Drawing Sheets

SUSPENSION ASSEMBLY HAVING A MICROACTUATOR ELECTRICALLY CONNECTED TO A GOLD COATING ON A STAINLESS STEEL SURFACE

BACKGROUND OF THE INVENTION

1. Field of the Invention

The present invention relates generally to the field of information storage devices, and more particularly to microactuators and suspension assemblies that are used to position read heads in information storage devices.

2. Background of the Art

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g. writing, flying height control, touch down detection, lapping control, etc).

In a modern magnetic hard disk drive device, each read head is a sub-component of a head gimbal assembly (HGA). The read head typically includes a slider and a read/write transducer. The read/write transducer typically comprises a magneto-resistive read element (e.g. so-called giant magneto-resistive read element, or a tunneling magneto-resistive read element) and an inductive write structure comprising a flat coil deposited by photolithography and a yoke structure having pole tips that face a disk media.

The HGA typically also includes a suspension assembly that includes a mounting plate, a load beam, and a laminated flexure to carry the electrical signals to and from the read head. The read head is typically bonded to a tongue feature of the laminated flexure. The HGA, in turn, is a sub-component of a head stack assembly (HSA) that typically includes a plurality of HGAs, a rotary actuator, and a flex cable. The mounting plate of each suspension assembly is attached to an arm of the rotary actuator (e.g. by swaging), and each of the laminated flexures includes a flexure tail that is electrically connected to the HSA's flex cable (e.g. by solder bonding).

Modern laminated flexures typically include electrically conductive copper traces that are isolated from a stainless steel support layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that are electrically connected to a plurality of electrically conductive bonding pads on the head, and extend from adjacent the head to terminate at electrical connection points at the flexure tail.

The position of the HSA relative to the spinning disks in a disk drive, and therefore the position of the read heads relative to data tracks on the disks, is actively controlled by the rotary actuator which is typically driven by a voice coil motor (VCM). Specifically, electrical current passed through a coil of the VCM applies a torque to the rotary actuator, so that the read head can seek and follow desired data tracks on the spinning disk.

However, the industry trend towards increasing areal data density has necessitated substantial reduction in the spacing between data tracks on the disk. Also, disk drive performance requirements, especially requirements pertaining to the time required to access desired data, have not allowed the rotational speed of the disk to be reduced. In fact, for many disk drive applications, the rotational speed has been significantly increased. A consequence of these trends is that increased bandwidth is required for servo control of the read head position relative to data tracks on the spinning disk.

One solution that has been proposed in the art to increase disk drive servo bandwidth is dual-stage actuation. Under the dual-stage actuation concept, the rotary actuator that is driven by the VCM is employed as a coarse actuator (for large adjustments in the HSA position relative to the disk), while a so-called "microactuator" having higher bandwidth but lesser stroke is used as a fine actuator (for smaller adjustments in the read head position). Various microactuator designs have been proposed in the art for the purpose of dual-stage actuation in disk drive applications. Some of these designs utilize one or more piezoelectric microactuators that are affixed to a stainless steel component of the suspension assembly (e.g. the mounting plate or an extension thereof, and/or the load beam or an extension thereof, and/or an intermediate stainless steel part connecting the mounting plate to the load beam).

However, if the microactuator is electrically connected to a stainless steel surface of the suspension assembly (e.g. for grounding), an electrochemical reaction may cause an oxidation layer to form on the stainless steel at the connection location. The oxidation layer may be insulative and interfere with desired electrical conduction, and may be exacerbated by hot and humid conditions. Over time, the desired response of the microactuator to applied signals may become diminished, leading to reduced or impaired performance of the information storage device and/or data loss.

Therefore, there is a need in the information storage device arts for a suspension assembly design that can improve integration with a microactuator (e.g. piezoelectric micro actuator).

SUMMARY

A novel suspension assembly includes a suspension assembly mounting plate, a microactuator mounting structure extending from the suspension assembly mounting plate, a load beam extending from the microactuator mounting structure, and a laminated flexure attached to the load beam. The laminated flexure includes a tongue that has a read head bonding surface. The suspension assembly includes a stainless steel surface having a gold coating, and a microactuator attached to the microactuator mounting structure and electrically connected to the gold coating.

DETAILED DESCRIPTION OF EXEMPLARY EMBODIMENTS

Figure 1:
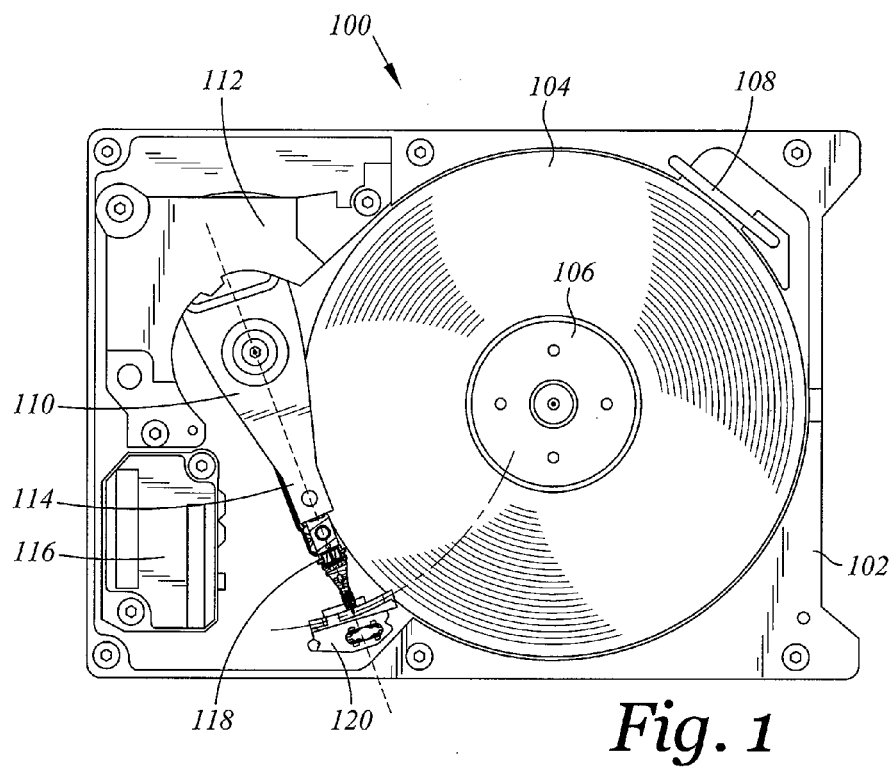
FIG. 1 is top view of a disk drive capable of including an embodiment of the present invention.

FIG. 1 is top view of a disk drive 100 that is capable of including an embodiment of the present invention. The disk drive 100 includes a disk drive base 102. The disk drive 100 further includes a spindle 106, rotably mounted on the disk drive base 102, for rotating a disk 104 that is mounted on the spindle 106. The rotation of the disks 104 establishes air flow through optional recirculation filter 108. In certain embodiments, disk drive 100 may have only a single disk 104, or alternatively, two or more disks.

The disk drive 100 further includes a rotary coarse actuator 110 that is rotably mounted on disk drive base 102. The rotary coarse actuator 110 includes an actuator arm 114 that supports a head gimbal assembly (HGA) 118. Voice coil motor 112 rotates the actuator 110 through a limited angular range so that the HGA 118 may be desirably positioned relative to one or more tracks of information on the disk 104. Preferably the disk drive 100 will include one HGA 118 per disk surface, but depopulated disk drives are also contemplated in which fewer HGAs are used. Under non-operating conditions the HGAs may be parked on ramp 120, for example to avoid contact with the disk 104 when it is not spinning. Electrical signals to/from the HGA 118 are carried to other drive electronics, in part via a flex cable (not shown) and a flex cable bracket 116.

Figure 2:
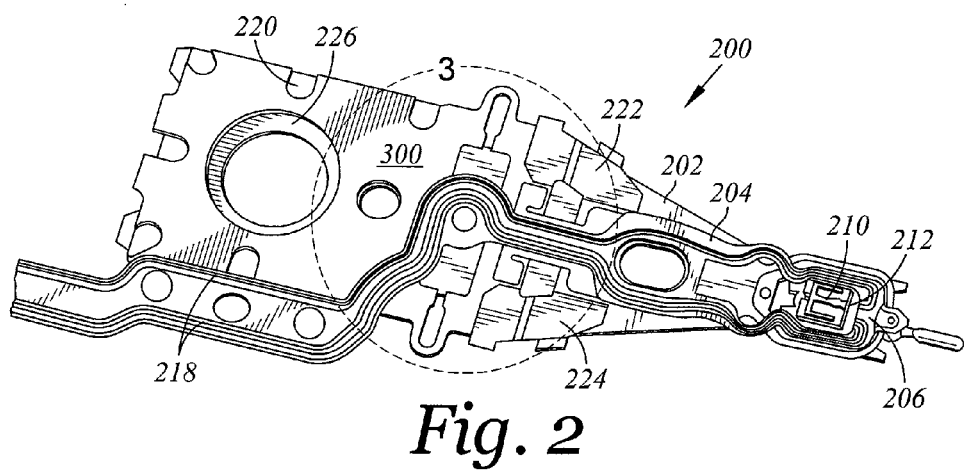
FIG. 2 is a bottom perspective view of a head gimbal assembly (HGA) capable of including an embodiment of the present invention.

FIG. 2 is a bottom perspective view of an HGA 200 that is capable of including an embodiment of the present invention. Now referring additionally to FIG. 2, the HGA 200 includes a load beam 202, and a read head 210 for reading and writing data from and to a magnetic disk (e.g. disk 104). The read head 210 includes a slider substrate having an air bearing surface (the label 210 points to this surface) and an opposing top surface (not visible in the view of FIG. 2). The slider substrate preferably comprises AlTiC, although another ceramic or silicon might also be used. The slider substrate of the read head 210 also includes a trailing face 212 that includes a read/write transducer (too small to be practically shown in the view of FIG. 2, but disposed on the trailing face 212). In certain embodiments, the read/write transducer is preferably an inductive magnetic write transducer merged with a magneto-resistive read transducer. The purpose of the load beam 202 is to provide limited vertical compliance for the read head 210 to follow vertical undulations of the surface of a disk (e.g. disk 104 of FIG. 1) as it rotates, and to preload the air bearing surface of the read head 210 against the disk surface by a preload force that is commonly referred to as the "gram load."

In the embodiment of FIG. 2, the HGA 200 also includes a laminated flexure 204 attached to the load beam 202. The laminated flexure 204 includes a tongue 206 that has a read head bonding surface. The head 210 is attached to the read head bonding surface of the tongue 206 of the laminated flexure 204. Only a portion of the tongue 206 is visible in the view of FIG. 2 because the read head 210 partially obscures it. A first purpose of the laminated flexure 204 is to provide compliance for the head 210 to follow pitch and roll angular undulations of the surface of the disk (e.g. disk 104) as it rotates, while restricting relative motion between the read head 210 and the load beam 202 in the lateral direction and about a yaw axis. A second purpose of the laminated flexure 204 is to provide a plurality of electrical paths to facilitate signal transmission to/from the read head 210. For that second purpose, the laminated flexure 204 includes a plurality of electrically conductive traces 218 that are defined in an electrically conductive (e.g. copper) sub-layer of the laminated flexure 204. Electrically conductive traces 218 are isolated from a support layer (e.g. stainless steel) by a dielectric layer (e.g. polyimide).

In the embodiment of FIG. 2, the load beam 202 includes hinge plates 222 and 224, and is attached to a mounting plate 220 via the hinge plates 222 and 224 and a microactuator mounting structure 300. These components may be made of stainless steel, and their attachments to each other may be made by a plurality of spot welds, for example. Alternatively, the load beam 202 may have integral hinge plate regions rather than being assembled with separate hinge plate components, so that the load beam 202 and its hinge plates would be a single component having material continuity.

The load beam 202 with its hinge plates 222, 224 (if any), the microactuator mounting structure 300, and the mounting plate 220, may together be referred to as a "suspension assembly." Accordingly, the mounting plate 220 may also be referred to as a suspension assembly mounting plate 220. In certain preferred embodiments, the suspension assembly mounting plate 220 includes a swage boss 226 to facilitate attachment of the suspension assembly to an actuator arm (e.g. actuator arm 114). In that case, the suspension assembly mounting plate 220 may also be referred to as a "swage mounting plate." Note that, after the laminated flexure 204 is attached to the load beam 202, the laminated flexure 204 may be considered to also pertain to the "suspension assembly." However, before the laminated flexure 204 is attached to the load beam 202, the term "suspension assembly" may refer to only the load beam 202 with its hinge plates 222, 224 (if any), and the mounting plate 220.

Figure 3:
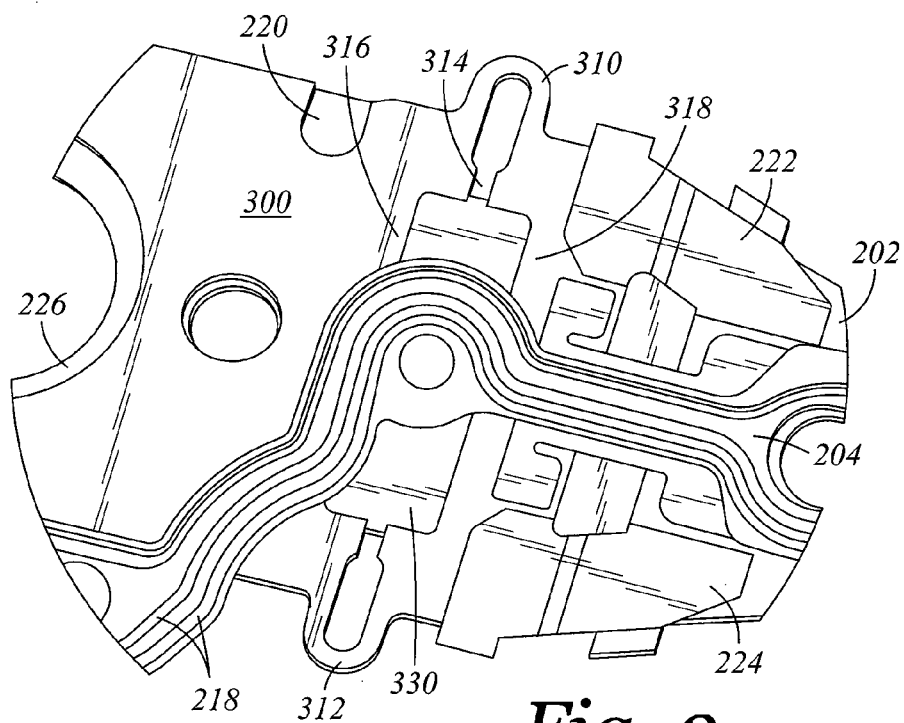
FIG. 3 is an expanded view of the region labeled 3 in FIG. 2.

FIG. 3 is an expanded view of the region of the HGA 200 that is labeled 3 in FIG. 2. Now referring additionally to FIG. 3, a microactuator mounting structure 300 is seen to extend from the suspension assembly mounting plate 220. In the embodiment of FIG. 3, the microactuator mounting structure 300 is seen to be a separate sub-component that is attached to the suspension assembly mounting plate 220 (e.g. by a plurality of spot welds). However, alternatively the microactuator mounting structure 300 and the suspension assembly mounting plate 220 may be a single component having material continuity rather than being an assembly of subcomponents.

The microactuator mounting structure 300 may include at least one compliant arm 310 so that the microactuator can move a distal portion 318 relative to an anchored portion 316 of the microactuator mounting structure 300. For example, in the embodiment of FIG. 3, the microactuator mounting structure 300 includes two compliant arms 310 and 312, so that the microactuator mounting structure encompasses a window 314. The window 314 is dimensioned so that it can be spanned by microactuator 330. Alternatively, however, the microactuator mounting structure 300 can be designed to have a single compliant arm (e.g. centered on a longitudinal axis of the suspension assembly) so that the microactuator mounting structure 300 would be generally I-shaped between distal and root portions. Such embodiments may have two microactuators on either side of the I-shape that span the distance from the distal portion to the root portion.

In the embodiment of FIG. 3, the load beam 202 extends from the distal portion 318 of the microactuator mounting structure 300, in that the load beam 202 includes the hinge plates 222 and 224 that are attached to and extend from the distal portion 318 of the microactuator mounting structure 300. In alternative embodiments, the hinge plates 222, 224 and the load beam 202 can be a single component having material continuity (rather than being an assembly of sub-components as shown in FIG. 3).

Figure 4:
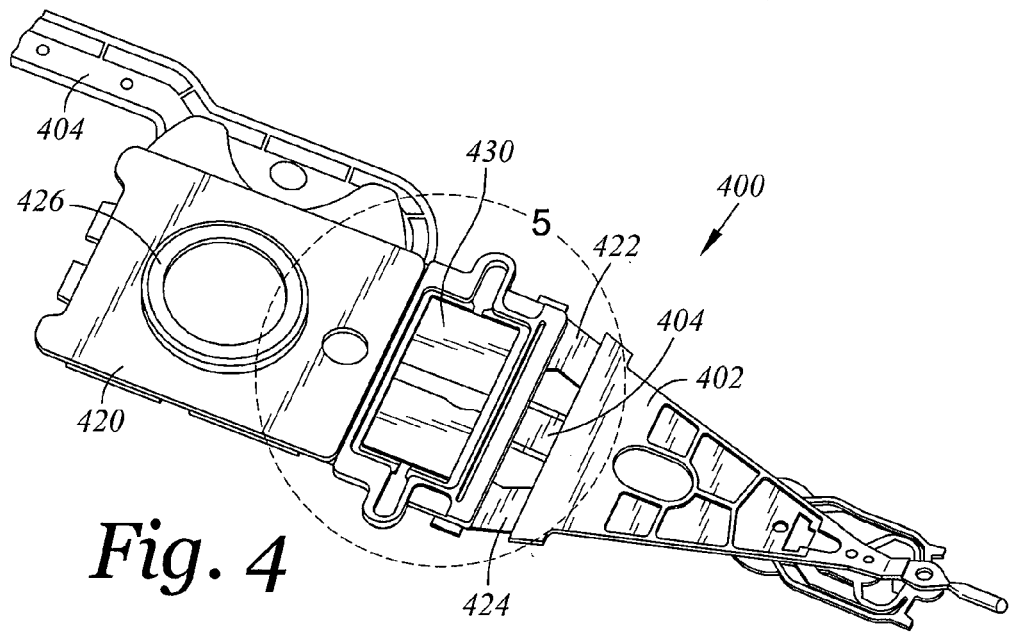
FIG. 4 is a top perspective view of a suspension assembly according to an embodiment of the present invention, after placement of the microactuator but before electrical connection of the microactuator.

FIG. 4 is a top perspective view of a suspension assembly 400 according to an embodiment of the present invention, after placement of a microactuator 430 but before electrical connection of the microactuator 430. In the embodiment of FIG. 4, the suspension assembly 400 includes a load beam 402 and a laminated flexure 404 attached to the load beam 402. The load beam 402 includes hinge plates 422 and 424, and is attached to a suspension assembly mounting plate 420 via the hinge plates 422 and 424. These components may be made of stainless steel, and their attachments to each other may be made by spot welding, for example. Alternatively, the load beam 402 may have integral hinge plate regions rather than being assembled with separate hinge plate components, so that the load beam 402 and its hinge plates would be a single component having material continuity. In certain preferred embodiments, the suspension assembly mounting plate 420 includes a swage boss 426 to facilitate attachment of the suspension assembly to an actuator arm (e.g. actuator arm 114).

Figure 5:
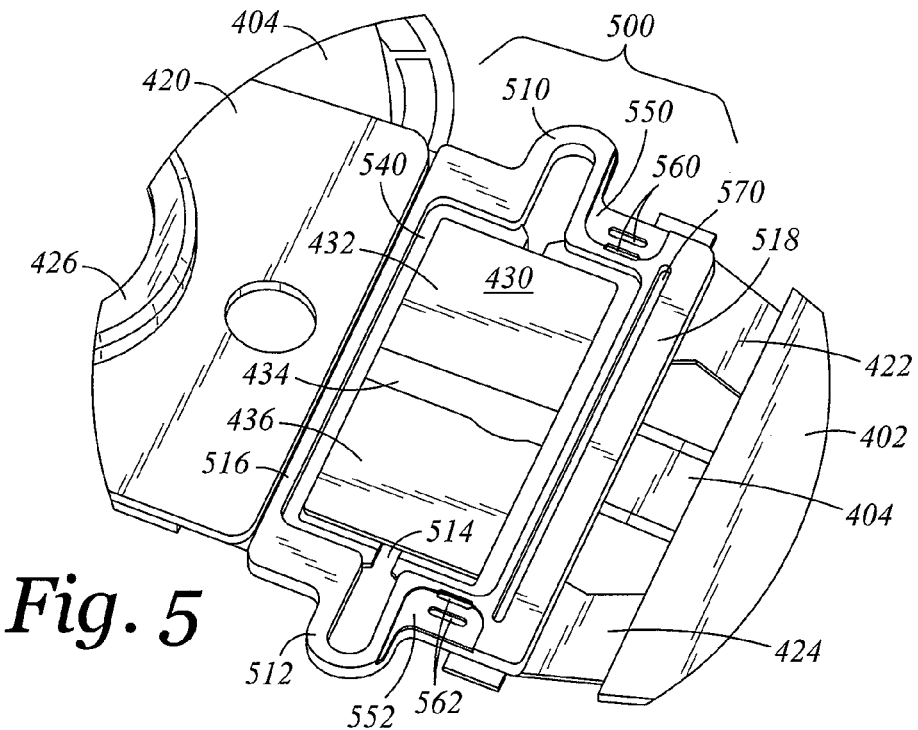
FIG. 5 is an expanded view of the region labeled 5 in FIG. 4.

FIG. 5 is an expanded view of the region of the suspension assembly 400 that is labeled 5 in FIG. 4. Now referring additionally to FIG. 5, the suspension assembly mounting plate 420 can be seen to include a microactuator mounting structure 500 extending from the suspension assembly mounting plate 420. In the embodiment of FIG. 5, the microactuator mounting structure 500 includes a partially etched well 540 into which the microactuator 430 may be placed. In certain preferred embodiments, the microactuator 430 is adhered to the microactuator mounting structure 500 by an adhesive (e.g. UV cured epoxy, thermal set epoxy, etc), and such adhesive or another encapsulate material may be disposed around the periphery of the microactuator 430 and within the partially etched well to help prevent particle shedding.

In the embodiment of FIG. 5, the microactuator mounting structure 500 includes at least one compliant arm 510 so that the microactuator 430 can move a distal portion 518 relative to an anchored portion 516 of the microactuator mounting structure 500. For example, in the embodiment of FIG. 5, the microactuator mounting structure 500 includes two compliant arms 510 and 512, so that the microactuator mounting structure encompasses a window 514. The window 514 is dimensioned so that it can be spanned by microactuator 430. Alternatively, however, the microactuator mounting structure 500 can be designed to have a single compliant arm so that the microactuator mounting structure 500 would be generally I-shaped between distal and root portions. Such embodiments may have two microactuators on either side of the I-shape that span the distance from the distal portion to the root portion.

In the embodiment of FIG. 5, the load beam 402 extends from the distal portion 518 of the microactuator mounting structure 500, in that the load beam 402 includes the hinge plates 422 and 424 that are attached to and extend from the distal portion 518 of the microactuator mounting structure 500. In alternative embodiments, the hinge plates 422, 424 and the load beam 402 can be a single component having material continuity (rather than being an assembly of sub-components as shown in FIG. 5). In the embodiment of FIG. 5, the distal portion 518 of the microactuator mounting structure 500 may optionally include a adhesive-limiting trench 570 to help prevent adhesive from reaching (and potentially undesirably affecting the structural characteristics of) the hinge plates 422, 424.

In the embodiment of FIG. 5, the microactuator mounting structure 500 of the suspension assembly 400 includes a stainless steel surface having two regions 550 and 552 that are coated with gold. Alternatively, one or more gold coatings can be disposed on a stainless steel surface of the suspension assembly mounting plate 420 outside but adjacent the anchored portion 516 of the microactuator mounting structure 500. Alternatively, a gold coating may be disposed on a stainless steel surface of each of the hinge plates 422, 424, outside but adjacent the distal portion 518 of the microactuator mounting structure 500. In either of these alternative embodiments, what is desired is that the gold coatings be disposed near enough to the microactuator 430 to facilitate electrical connection thereto. Preferably but not necessarily, the two gold-coated regions 550 and 552 of the stainless steel surface of the microactuator mounting structure 500 include partial etched trenches 560 and 562, respectively.

In the embodiment of FIG. 5, the microactuator 430 includes top electrodes 432 and 436, separated by an isolation region 434. However, in the view of FIG. 5, the top electrodes 432 and 436 are not electrically connected to the two gold-coated regions 550 and 552 of the stainless steel surface of the microactuator mounting structure 500. In certain preferred embodiments, the microactuator 430 is a piezoelectric microactuator that is polarized differently beneath the top electrode 432 than it is beneath the top electrode 436, to facilitate differential motion despite the application of a common electrical field from a common bottom electrode (not shown). In certain other embodiments, the microactuator is a piezoelectric microactuator that is polarized similarly beneath the top electrode 432 and the top electrode 436, with differential motion being created by the application of different or opposite voltages to one opposing bottom electrode (not shown) versus another.

Figure 6:
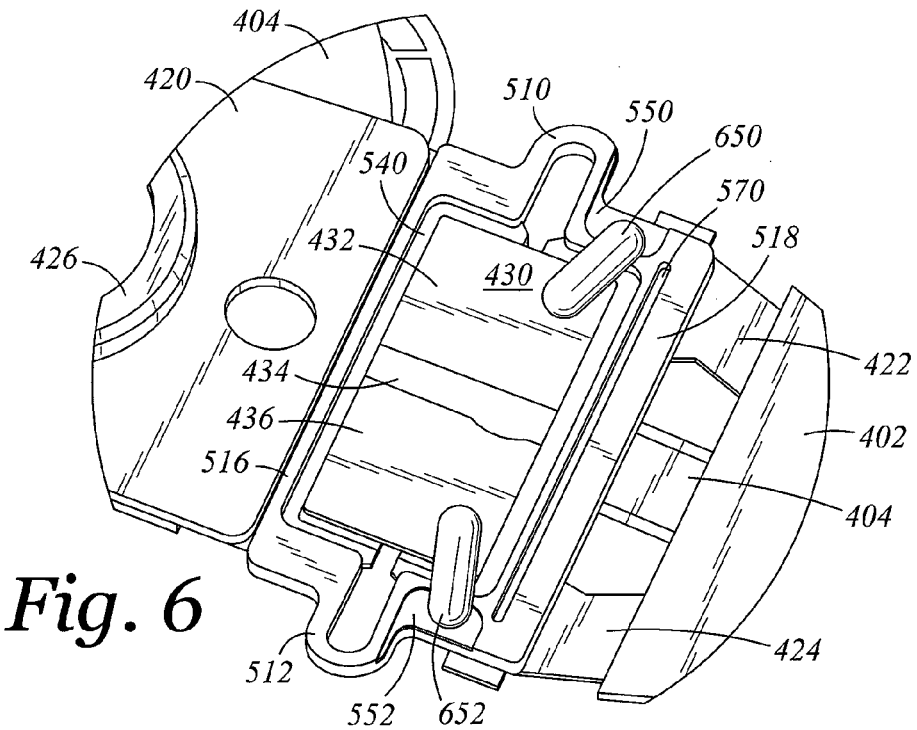
FIG. 6 is an expanded view of the region labeled 5 in FIG. 4, except after electrical connection of the microactuator.
Figure 7:
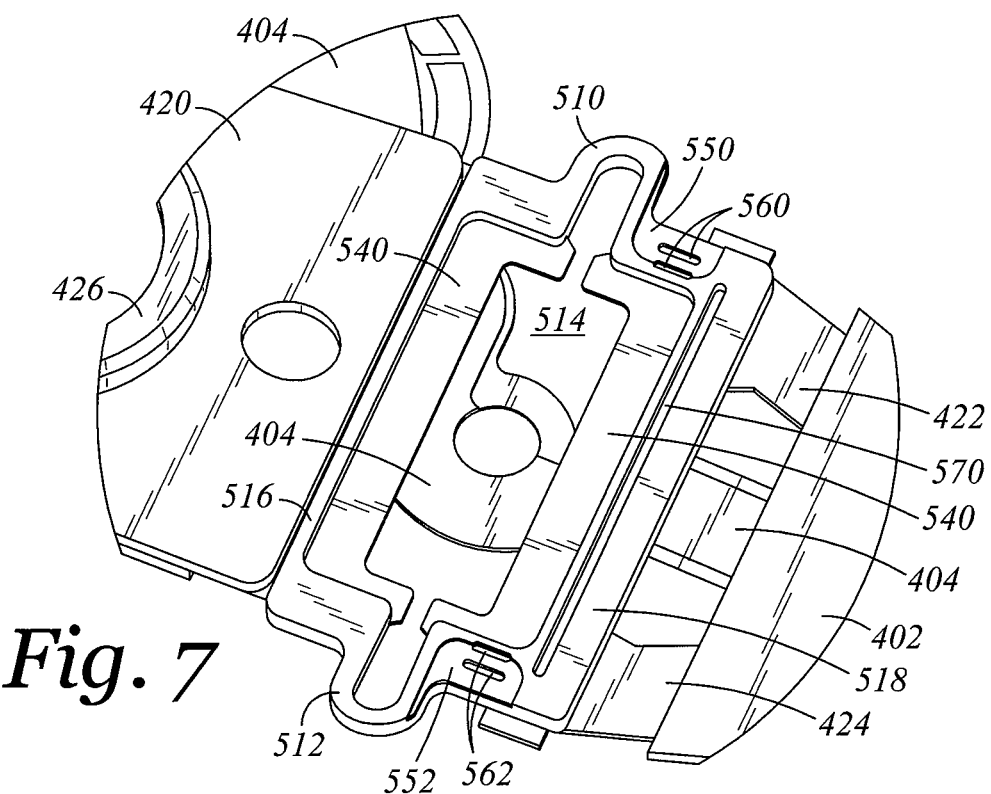
FIG. 7 is an expanded view of the region labeled 5 in FIG. 4, except before placement of the microactuator.

FIG. 6 is an expanded view of the region labeled 5 in FIG. 4 (of the suspension assembly 400), except after electrical connection of the top electrodes 432 and 436 of the microactuator 430 to the two gold-coated regions 550 and 552 of the stainless steel surface of the microactuator mounting structure 500. FIG. 7 is an expanded view of the region labeled 5 in FIG. 4 (of the suspension assembly 400), except before placement of the microactuator 430.

Specifically, and now referring additionally to FIGS. 6 and 7, the top electrodes 432 and 436 of the microactuator 430 have been electrically connected to the two gold-coated regions 550 and 552 of the stainless steel surface of the microactuator mounting structure 500, by beads 650 and 652 of epoxy adhesive that is doped with silver particles. Alternatively, solder or gold wire stitching may be used to make the electrical connections. However, if solder is used and the microactuator is a piezoelectric microactuator, then it may be desirable for the solder to be a low temp-melting-point since it should not need to get so hot that the piezoelectric material (e.g. PZT) is depolarized.

In certain embodiments, the gold coating in gold-coated regions 550 and 552 may advantageously diminish or prevent an electrochemical reaction that could cause an undesirable oxidation layer to form on the stainless steel surface at the connection locations, and thereby improve the reliability of the electrical connections. Note that the partial etched trenches 560 and 562 may also improve the reliability of the electrical connection of the top electrodes 432 and 436 of the microactuator 430 to the two gold-coated regions 550 and 552.

In certain embodiments, the microactuator may include two piezoelectric elements, each connected to at least one of the plurality of conductive traces (e.g. conductive traces 218). In such embodiments, each piezoelectric element can be separately or differently energized to create a desired motion of the distal portion of the microactuator mounting portion relative to the anchor portion thereof. In another embodiment, the microactuator includes one piezoelectric element (as shown in FIG. 5) having bottom electrodes that are electrically connected to two of the plurality of conductive traces. In such an embodiment, a different voltage can be applied to different portions of the piezoelectric element to create a desired motion of the distal portion of the microactuator mounting portion relative to the anchor portion thereof. In a preferred embodiment, the microactuator 430 includes one piezoelectric element having a common bottom electrode that is electrically connected to only a single one of the plurality of conductive traces (with the top electrode or electrodes connected to ground via the suspension assembly stainless steel structure). In such an embodiment, the piezoelectric element is preferably polarized differently beneath one surface electrode versus another, to facilitate differential motion despite the application of a common voltage from the single conductive trace. Note that in the aforementioned embodiments, the side of the piezoelectric microactuator that is grounded may be grounded via connection to the stainless steel parts of the suspension assembly (used as the ground conductor rather than or in addition to a ground trace of the laminated flexure).

Figure 8:
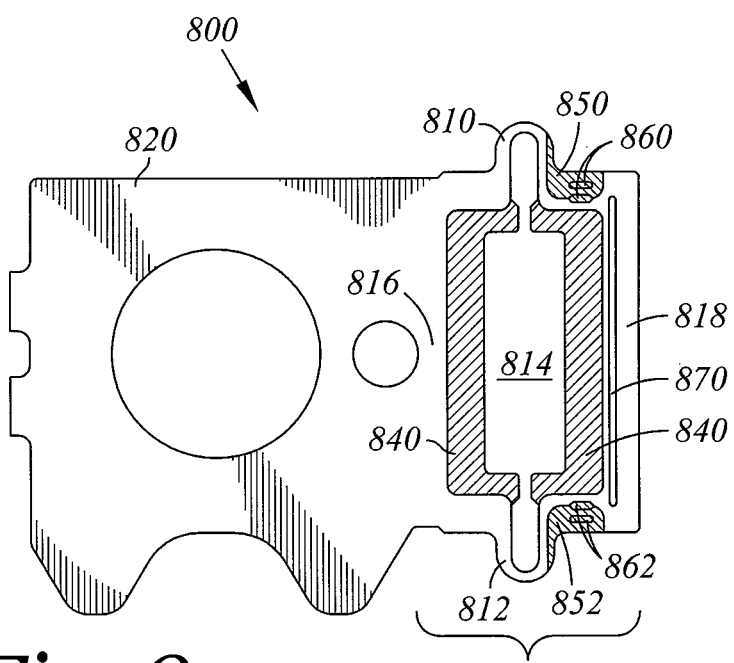
FIG. 8 is a top plan view of a suspension assembly component that includes a mounting plate and a microactuator mounting structure, according to an embodiment of the present invention.

FIG. 8 is a top plan view of a suspension assembly component 800 according to an embodiment of the present invention. The suspension assembly component 800 includes a mounting plate portion 820 and a microactuator mounting structure 801 extending from the mounting plate portion 820. In the embodiment of FIG. 8, the mounting plate portion 820 and the microactuator mounting structure 801 are shown to be a single component having material continuity rather than being an assembly of subcomponents.

In the embodiment of FIG. 8, the microactuator mounting structure 801 includes a partially etched well 840 into which a microactuator may be placed. The microactuator mounting structure 801 includes at least one compliant arm 810 so that a microactuator can move a distal portion 818 relative to an anchored portion 816 of the microactuator mounting structure 801. For example, in the embodiment of FIG. 8, the microactuator mounting structure 801 includes two compliant arms 810 and 812, so that the microactuator mounting structure encompasses a window 814. The window 814 is dimensioned so that it can be spanned by a microactuator.

In the embodiment of FIG. 8, the distal portion 818 of the microactuator mounting structure 801 includes a stainless steel surface having two regions 850 and 852 that are coated with gold. Alternatively, one or more gold coatings can be disposed on a stainless steel surface of the mounting plate portion 820, for example outside but adjacent the anchored portion 816 of the microactuator mounting structure 801. In either of these alternative embodiments, what is desired is that the gold coatings be disposed near enough to the partially etched well 840 to facilitate electrical connection to a microactuator placed therein. Preferably but not necessarily, the two gold-coated regions 850 and 852 of the stainless steel surface of the microactuator mounting structure 801 include partial etched trenches 860 and 862, respectively, which may increase the reliability of electrical connections made thereto. In the embodiment of FIG. 8, the distal portion 818 of the microactuator mounting structure 801 may optionally also include an adhesive-limiting trench 870.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A suspension assembly comprising:
a suspension assembly mounting plate;
a microactuator mounting structure extending from the suspension assembly mounting plate;
a load beam extending from the microactuator mounting structure; and
a laminated flexure attached to the load beam, the laminated flexure including a tongue that has a read head bonding surface;
wherein the microactuator mounting structure includes a stainless steel surface having at least one partial etched trench, the partial etched trench in the stainless steel surface being coated with a gold coating, and the suspension assembly further comprises a microactuator attached to the microactuator mounting structure and electrically connected to the gold coating.

2. The suspension assembly of claim 1 wherein the microactuator mounting structure and the suspension assembly mounting plate are a single component having material continuity rather than being an assembly of subcomponents.

3. The suspension assembly of claim 1 wherein the microactuator mounting structure is attached to the suspension assembly mounting plate by a plurality of spot welds.

4. The suspension assembly of claim 1 wherein the microactuator is electrically connected to the gold coating with an epoxy adhesive that is doped with silver particles.

5. The suspension assembly of claim 1 wherein the laminated flexure includes a structural layer, a dielectric layer, and a conductive layer that defines a plurality of conductive traces.

6. The suspension assembly of claim 5 wherein the microactuator includes two piezoelectric elements, and wherein each of the two piezoelectric elements is electrically connected to at least one of the plurality of conductive traces.

7. The suspension assembly of claim 5 wherein the microactuator includes one piezoelectric element, and wherein the piezoelectric element is electrically connected to only one of the plurality of conductive traces.

8. A head gimbal assembly (HGA) comprising:
a suspension assembly, the suspension assembly including
a suspension assembly mounting plate;
a microactuator mounting structure extending from the suspension assembly mounting plate;
a load beam extending from the microactuator mounting structure; and
a laminated flexure attached to the load beam, the laminated flexure including a tongue;
wherein the microactuator mounting structure includes a stainless steel surface having at least one partial etched trench, the partial etched trench in the stainless steel surface being coated with a gold coating, and the suspension assembly further comprises a microactuator attached to the microactuator mounting structure and electrically connected to the gold coating; and
a read head bonded to the tongue.

9. The HGA of claim 8 wherein the microactuator mounting structure and the suspension assembly mounting plate are a single component having material continuity rather than being an assembly of subcomponents.

10. The HGA of claim 8 wherein the microactuator mounting structure is attached to the suspension assembly mounting plate by a plurality of spot welds.

11. A disk drive comprising:
a disk drive base;
a spindle attached to the disk drive base;
a disk mounted on the spindle;
a coarse actuator attached to the disk drive base, the coarse actuator including an actuator arm;

a suspension assembly, the suspension assembly including
   a suspension assembly mounting plate attached to the actuator arm;
   a microactuator mounting structure extending from the suspension assembly mounting plate;
   a load beam extending from the microactuator mounting structure; and
   a laminated flexure attached to the load beam, the laminated flexure including a tongue;
   wherein the microactuator mounting structure includes a stainless steel surface having at least one partial etched trench, the partial etched trench in the stainless steel surface being coated with a gold coating, and the suspension assembly further comprises a microactuator attached to the microactuator mounting structure and electrically connected to the gold coating; and
a read head bonded to the tongue.

12. The disk drive of claim 11 wherein the microactuator is electrically connected to the gold coating with an epoxy adhesive that is doped with silver particles.

13. The disk drive of claim 11 wherein the laminated flexure includes a structural layer, a dielectric layer, and a conductive layer that defines a plurality of conductive traces, and wherein the read head is electrically connected to more than one of the plurality of conductive traces.

14. The disk drive of claim 13 wherein the microactuator includes two piezoelectric elements, and wherein each of the two piezoelectric elements is electrically connected to at least one of the plurality of conductive traces.

15. The disk drive of claim 13 wherein the microactuator includes one piezoelectric element, and wherein the piezoelectric element is electrically connected to two of the plurality of conductive traces.

16. The disk drive of claim 13 wherein the microactuator includes one piezoelectric element, and wherein the piezoelectric element is electrically connected to only one of the plurality of conductive traces.

17. The disk drive of claim 11 wherein the microactuator mounting structure and the suspension assembly mounting plate are a single component having material continuity rather than being an assembly of subcomponents.

18. The disk drive of claim 11 wherein the microactuator mounting structure is attached to the suspension assembly mounting plate by a plurality of spot welds.

* * * * *